I. E. MERCER.
VALVE.
APPLICATION FILED AUG. 13, 1910.
982,286.
Patented Jan. 24, 1911.
2 SHEETS—SHEET 1.
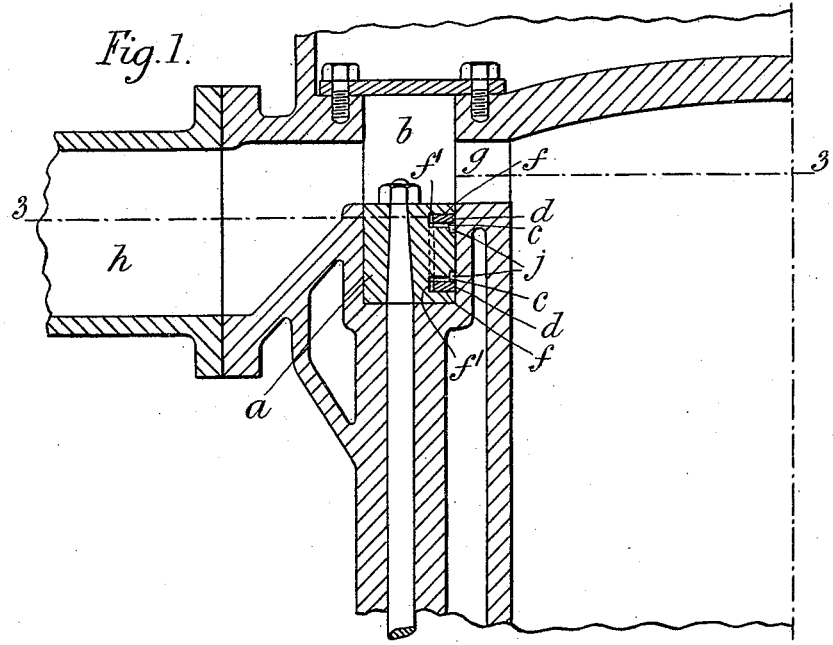
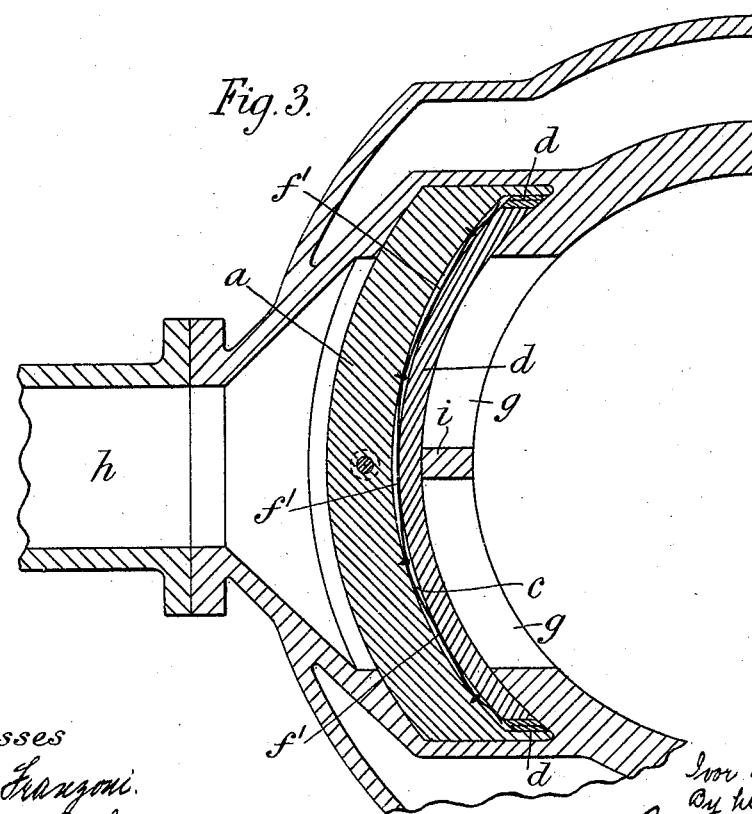

I. E. MERCER.
VALVE.
APPLICATION FILED AUG. 13, 1910.

982,286.

Patented Jan. 24, 1911.

2 SHEETS—SHEET 2.

Witnesses
C. D. Franzoni.
C. F. Early.

Inventor.
Ivor E. Mercer,
By his Attorneys
Baldwin & Wight

UNITED STATES PATENT OFFICE.

IVOR EDWIN MERCER, OF GRAVESEND, ENGLAND.

VALVE.

982,286. Specification of Letters Patent. Patented Jan. 24, 1911.

Application filed August 13, 1910. Serial No. 577,040.

*To all whom it may concern:*

Be it known that I, IVOR EDWIN MERCER, a subject of the King of Great Britain, residing at The Cedars, Kent Road, Gravesend, in the county of Kent, England, have invented an Improvement in Valves, of which the following is a specification.

This invention relates to improvements in valves of the class in which a gas tight joint is made between the valve and its seat by means of a packing ring or rings in the valve which are forced by fluid pressure against the seat.

By my invention I form the valves of internal combustion engines in the way hereinafter described to insure that when pressure is generated within the cylinder of the engine a tight joint is obtained in this way between the valve and its seat. The valve is moved over a valve seat in which is a port leading into the interior of the cylinder.

In the face of the valve is a slot or recess within which is a packing ring which, when the valve is brought to rest in a position to close over the port in the seat, bears against the face of the seat all around the edges of the port. The recess within which is placed the packing ring is made somewhat deeper than the depth of the ring and a passage is provided which leads to the back of the ring so that when pressure is generated in the cylinder this pressure at once acts to force the ring against the valve seat and also against the outer side of the recess. This passage may be formed by making the recess somewhat wider than the thickness of the packing ring.

The drawings show valves constructed according to this invention which are suitable for an internal combustion engine.

Figure 4:
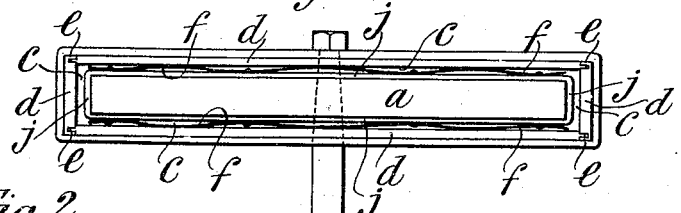
Figure 2:
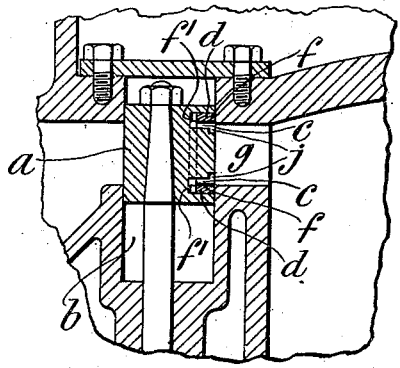
Figure 5:
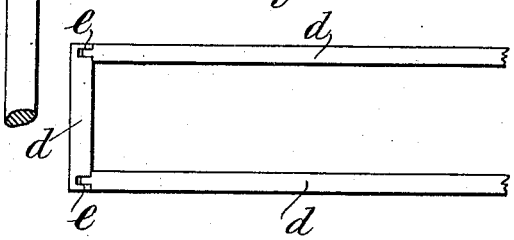
Figure 6:
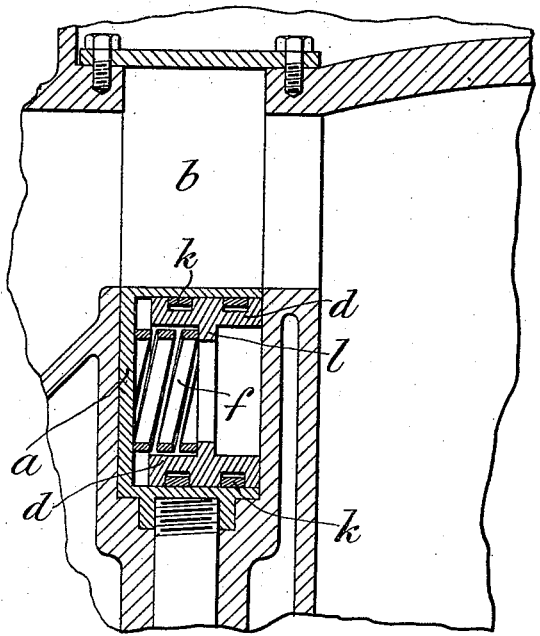

Figure 1 is a part longitudinal section of the cylinder showing the valve in cross section in its open position. Fig. 2 is a similar view showing the valve in its closed position. Fig. 3 is a section on the line 3—3 Fig. 1. Fig. 4 is a face view of the valve. Fig. 5 is an enlarged view showing one way of preventing leakage between the different pieces of the packing ring. Fig. 6 is a part longitudinal section showing a modified form of valve and packing ring.

In Figs. 1 to 5 $a$ is the valve working in the chamber $b$. In the face of the valve $a$ groove $c$ is made containing the packing ring $d$. The ring $d$ is preferably made of more than one piece the ends of the pieces being suitably formed so as to break joint as for instance shown at $e$ Fig. 5. $f$ are springs which tend to force the ring against the side of the slot and $f'$ are springs which tend to force it against the seat. $g$ is a port opening into the cylinder, and on the other side of the chamber there is an opening leading to the inlet or exhaust pipe $h$. The port $g$ preferably has one or more ribs $i$ extending across it to act as guides for the packing ring. The groove $c$ may be extended as at $j$ in order that the gas may act on the ring a little earlier. When the groove is made deeper than the ring $d$ but not wider than it, suitable passages are provided to allow the pressure in the cylinder to communicate with the back of the ring $d$. This may be done by grooving the ring or the side of the slot.

In the modification shown in Fig. 6 the valve $a$ is formed as a box or shell containing the packing ring $d$ of considerable depth forming a passage through which gas generated in the cylinder can pass so as to act upon the back of the ring $d$ to force it against the seat, split packing rings $k$ being provided to prevent any leakage between the valve $a$ and packing ring $d$. The packing ring $d$ is normally pressed against the seat by means of the spring $f$ acting upon a flange $l$ on the ring $d$.

What I claim is:—

1. In an internal combustion engine, the combination of a cylinder, a fixed valve seat having a part in it leading to said cylinder, a valve adapted to be moved over said seat, a recess in the face of said valve next the cylinder port, a packing ring less deep than the recess located within said recess and adapted, when the valve is brought to rest in a position to close the port, to bear against the valve seat all around the port and a passage leading from the cylinder port to the back of the packing ring.

2. In an internal combustion engine, the combination of a cylinder, a fixed valve seat having a port in it leading to said cylinder, a valve adapted to be moved over said seat, a recess in the face of said valve next the cylinder port, a packing ring less deep and less wide than the recess located within said recess and adapted, when the valve is brought to rest in a position to close the port, to bear against the valve seat all around the port.

3. In an internal combustion engine, the combination of a cylinder, a fixed valve seat having a port in it leading to said cylinder, a valve adapted to be moved over said seat, a recess in the face of said valve next the cylinder port, a packing ring less deep than the recess located within said recess and adapted, when the valve is brought to rest in a position to close the port, to bear against the valve seat all around the port, a spring which tends to force the packing ring against the seat, and a passage leading from the cylinder port to the back of the packing ring.

4. In an internal combustion engine, the combination of a cylinder, a fixed valve seat having a port in it leading to said cylinder, a valve adapted to be moved over said seat, a recess in the face of said valve next the cylinder port, a packing ring less deep and less wide than the recess located within said recess and adapted, when the valve is brought to rest in a position to close the port, to bear against the valve seat all around the port, and a spring which tends to force the packing ring against the seat.

IVOR EDWIN MERCER.

Witnesses:
 HERBERT D. JAMESON,
 G. P. PHILLIPPS.